United States Patent [19]

Schenk et al.

[11] Patent Number: 5,797,645

[45] Date of Patent: Aug. 25, 1998

[54] VEHICLE WINDOW VISOR AND VENTILATOR

[75] Inventors: Mitchell V. Schenk, Elkhart; John C. Ray, Bristol; Bradley S. Howard, Elkhart, all of Ind.

[73] Assignee: Plastic Form, Inc., Elkhart, Ind.

[21] Appl. No.: 735,854

[22] Filed: Oct. 23, 1996

[51] Int. Cl.$^6$ ............................................. B60J 1/20
[52] U.S. Cl. .................... 296/152; 296/154; 454/132; 454/133
[58] Field of Search ........................... 296/152, 154; 454/95, 128, 131, 132, 133

[56] References Cited

U.S. PATENT DOCUMENTS

| 1,787,637 | 1/1931 | McNab | 454/133 |
|---|---|---|---|
| 1,923,207 | 8/1933 | Hosler | 454/133 |
| 2,062,475 | 12/1936 | Paton | 454/135 |
| 2,106,418 | 1/1938 | Wagner | 454/133 |
| 2,251,511 | 8/1941 | Burke | 454/131 |
| 2,859,680 | 11/1958 | O'Shei | 454/133 |
| 2,919,638 | 1/1960 | Mathews | 454/133 |
| 3,434,408 | 3/1969 | Rivers et al. | 454/132 |
| 3,866,524 | 2/1975 | Forbes | 454/131 |
| 4,756,242 | 7/1988 | Keith | 98/2.13 |
| 4,923,241 | 5/1990 | Miller | 296/154 |
| 5,251,953 | 10/1993 | Willey | 296/152 |

OTHER PUBLICATIONS

Ad "GTS Styling in Motion", Nov./Dec. 1994 Trucking Times magazine.
Ad "Ventvisor", pg. 33 and Off Road Aerovisor Wind Deflector, pg. 34. (admitted prior art).
Installation Instructions from Auto Ventshade Company, "Ventvisor Deflector", 247G, 1991.
Installation Instructions from Auto Ventshade Company, "Ventvisor Deflector", 277F, 281F, 283F. (admitted prior art).
Ad "Ventshade", p. 35. (admitted prior art).
Flyer showing Auto Ventshade Company Ventvisor, Aerovisor products distributed by Century, 2 pages, 1994.
Flyer by Driver Design showing T-300 RAM Truck Air Flares. (admitted prior art).
Driver Design 1995–1996 Full Line application chart, front cover, Oct. 1995.
Ad "The G.T. Styling Difference", Nov./Dec. 1995, Trucking Times magazine.
EGR Flyer. (admitted prior art).
3M Acrylic Foam Tape leaflet, 4 pages, 1994.
Ad "Looking Good", Nov./Dec. 1995 Trucking Times magazine.
1995 Catalog, GTS Styling in Motion, pp. 1, 3, 16–19, 23, 1995.

*Primary Examiner*—Dennis H. Pedder
*Assistant Examiner*—Jason Morrow
*Attorney, Agent, or Firm*—Leon E. Redman; Malcolm L. Sutherland

[57] ABSTRACT

A visor attachable above a side window of a vehicle with a portion curving and extending outwardly and in accordance with the configuration of the forward and top edges of the window opening to shield and deflect rain, snow and noise from entering the passenger compartment through a partially opened window and a wall forming a recessed area in a portion of the visor to reduce air pressure therein as the vehicle travels forward, the wall also forming an inner pocket on the inside of the visor and the wall provided with a plurality of spaced apart small round holes extending through the wall to cause a venturi effect which ventilates stale air from the passenger compartment through the round holes. A rib extends generally horizontally from the wall and divides the depression into two parallel low pressure channels and an outwardly projecting lip is formed along the outward edge of the visor.

3 Claims, 6 Drawing Sheets

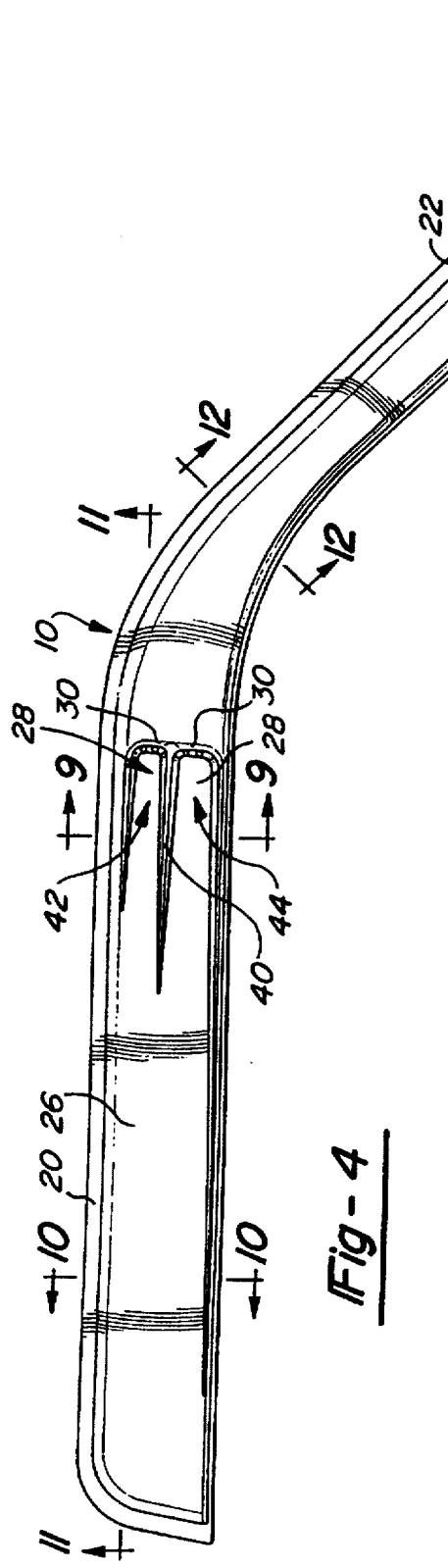
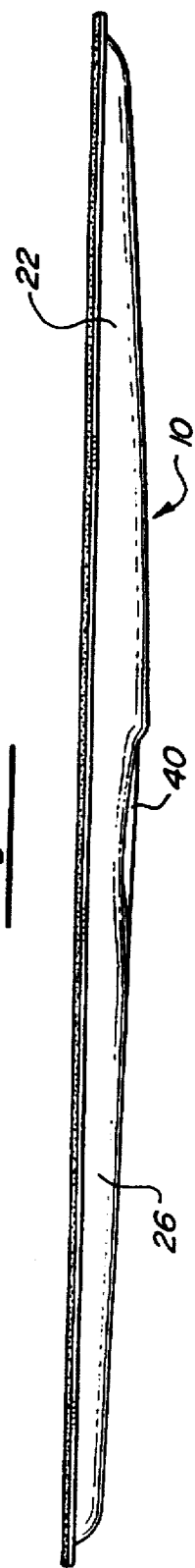
Fig-4
Fig-5

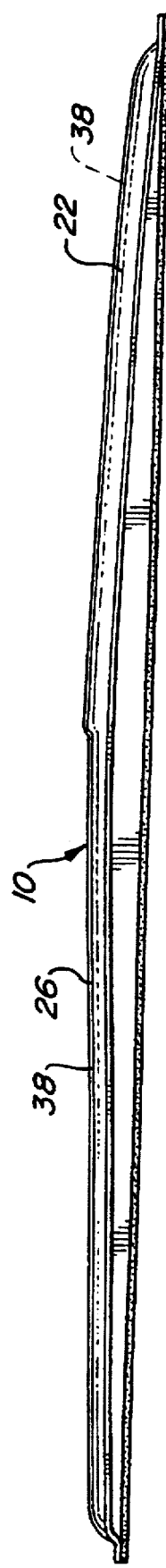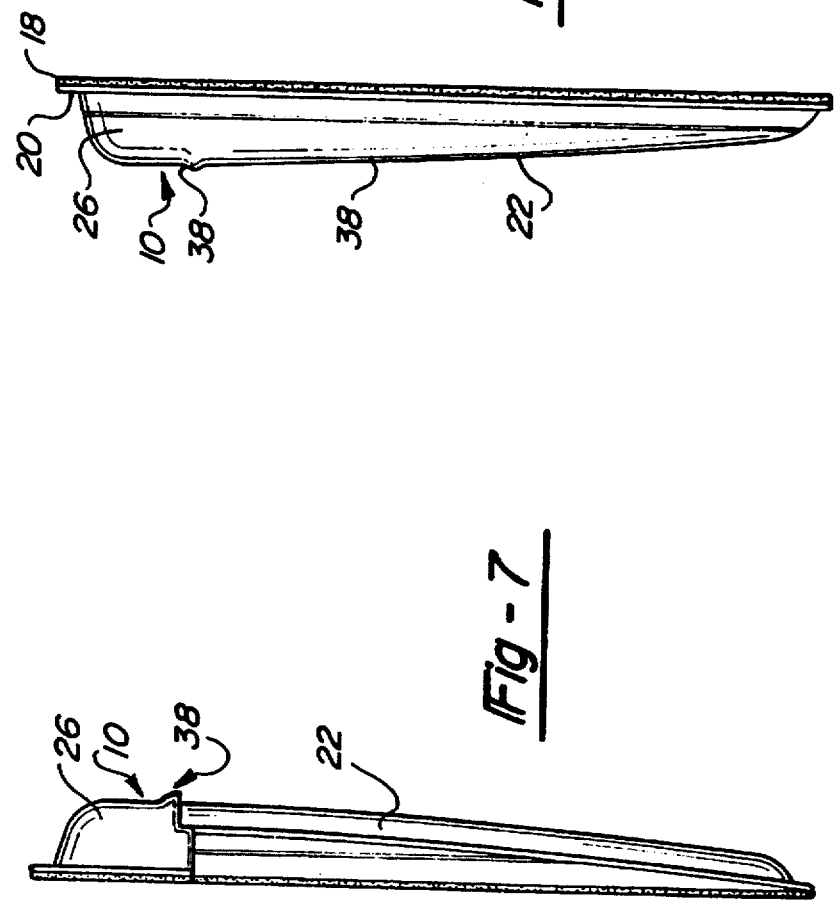

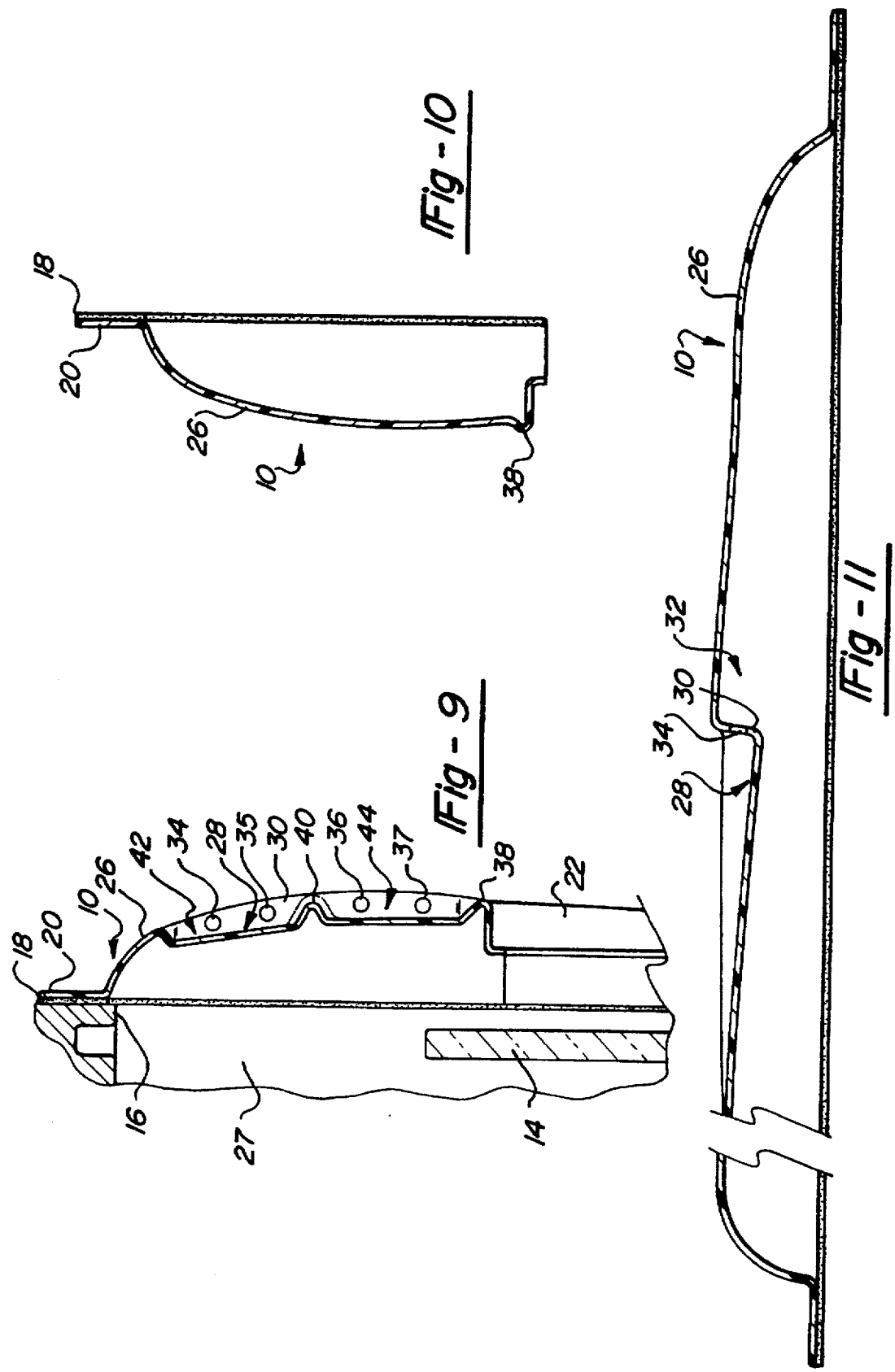

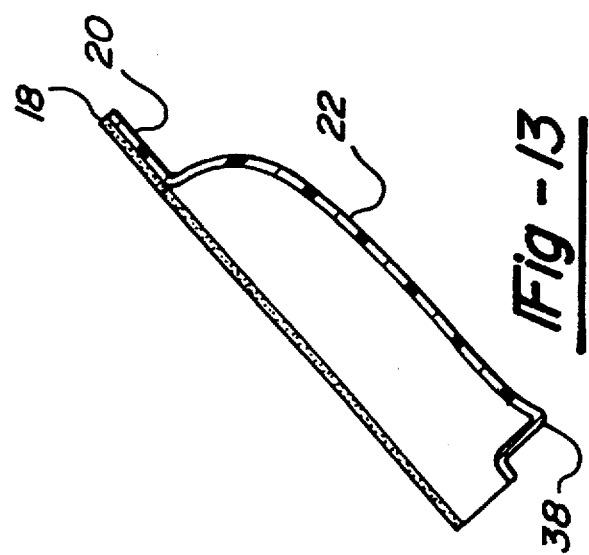
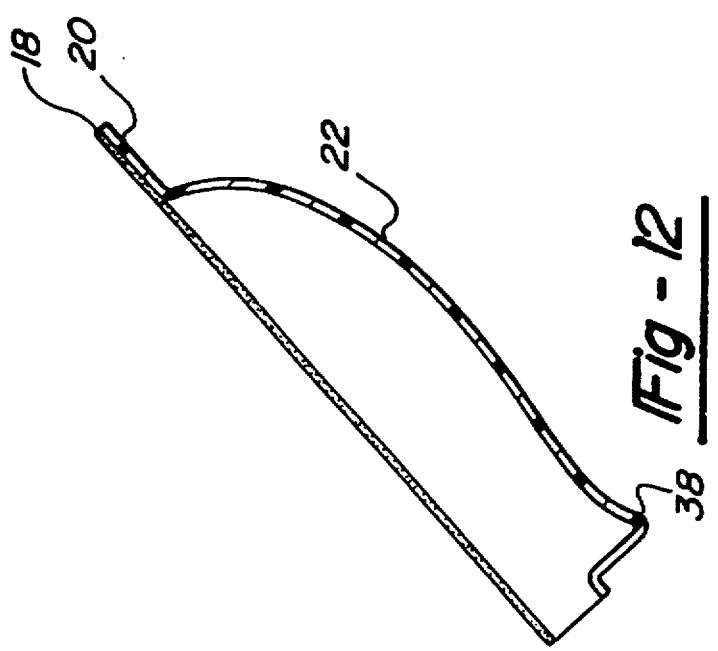

VEHICLE WINDOW VISOR AND VENTILATOR

FIELD OF THE INVENTION

The present invention relates to vehicle ventilation and in particular a side window wind/rain visor and ventilator for vehicles.

BACKGROUND OF THE INVENTION

Vehicle window visors that deflect rain and wind while allowing a vehicle side window to be partially opened to provide ventilation for the interior of the vehicle are know in the prior art. Such vehicle window vents are quite limited in the effectiveness of ventilation provided by exhausting air from within the vehicle through the window opening as a vehicle moves through the outside air.

A significant short coming of such inadequate ventilation is that insufficient stale fumes, air and moisture are removed from the passenger compartment of the vehicle.

Accordingly it is a primary object of the present invention to significantly enhance the ventilation of stale air from the passenger compartment of a moving vehicle without introducing moisture or wind noise which would be discomforting to the vehicle passengers.

It is a further object to significantly increase the effectiveness of ventilating stale air from the passenger compartment via a partially open vehicle side window visor in accordance with increased vehicle speed.

It is yet a further object of the present invention to provide a window visor which meets the above objects and is a simple construction that is inexpensive to manufacture and is desirable in styling.

These and various other objects and advantages are achieved by the present invention as will be apparent from the following specification, drawings and claims.

BRIEF DESCRIPTION OF THE DRAWING

FIG. 4 is a side elevation of the visor ventilator of FIG. 3;

FIG. 5 is a top plan view of the visor ventilator of FIG. 3;

FIG. 6 is a bottom plan view of the visor ventilator of FIG. 3;

FIG. 7 is a rear elevation of the visor ventilator of FIG. 3;

FIG. 8 is a front elevation of the visor ventilator of FIG. 3;

FIG. 9 is an enlarged cross-sectional view taken along lines 9—9 of FIG. 4 of a fragmented portion of the visor ventilator;

FIG. 10 is an enlarged cross-sectional view taken along lines 10—10 of FIG. 4;

FIG. 11 is an enlarged partially broken cross-sectional view taken along lines 11—11 of FIG. 3;

FIG. 12 is an enlarged cross-sectional view taken along lines 12—12 of FIG. 4; and FIG. 13 is an enlarged cross-sectional view taken along lines 13—13 of FIG. 4.

DESCRIPTION OF THE PREFERRED EMBODIMENT

Figure 1:
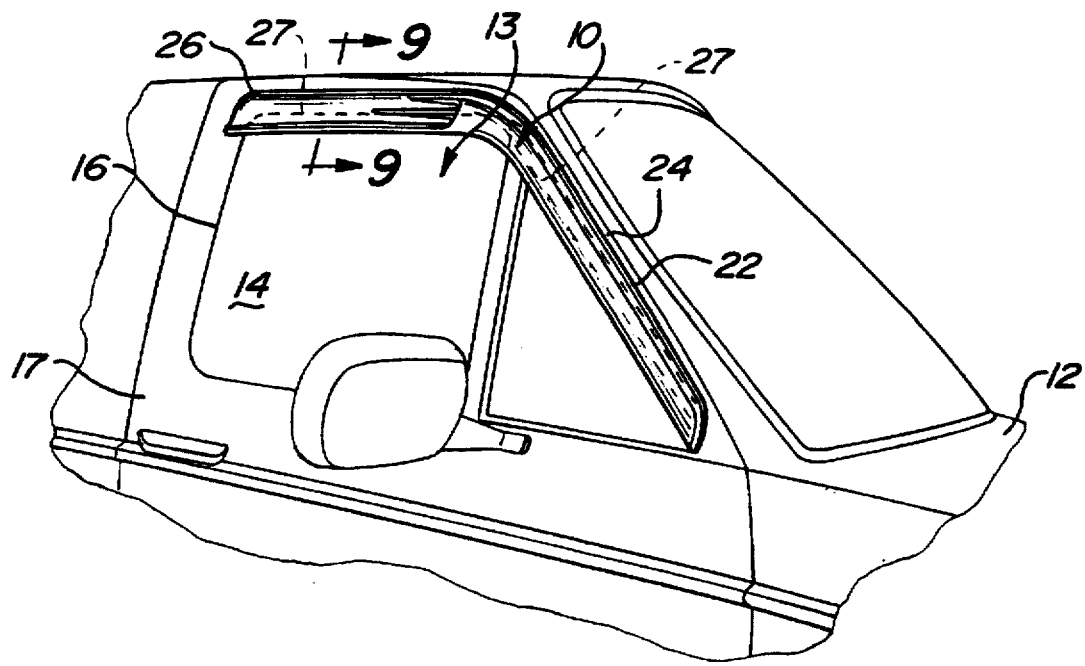
FIG. 1 is a partial perspective of a vehicle with the visor and ventilator of the present invention mounted at a partially open side window.
Figure 2:
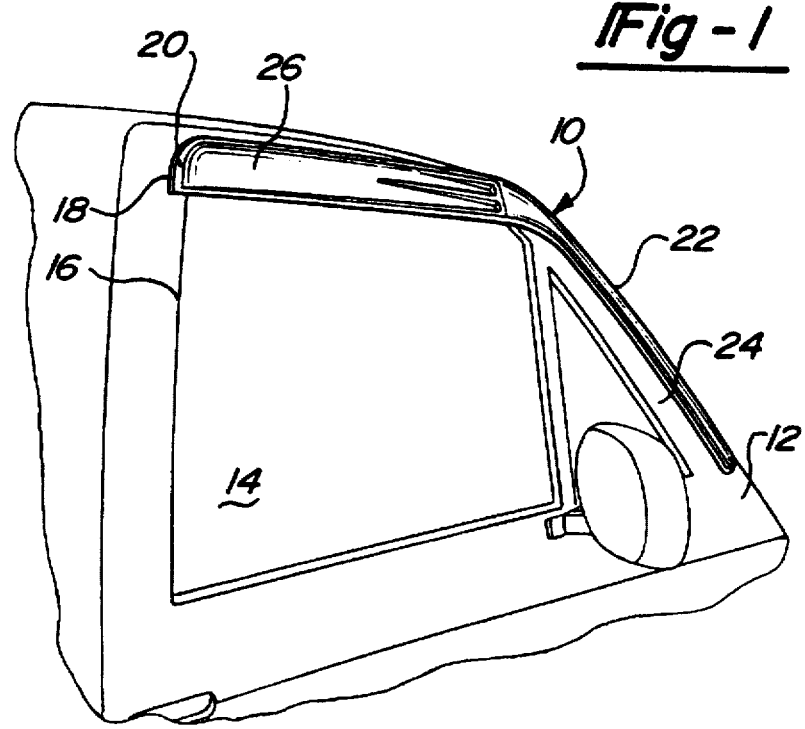
FIG. 2 is a partial left side perspective of the vehicle and visor ventilator of FIG. 1.
Figure 3:
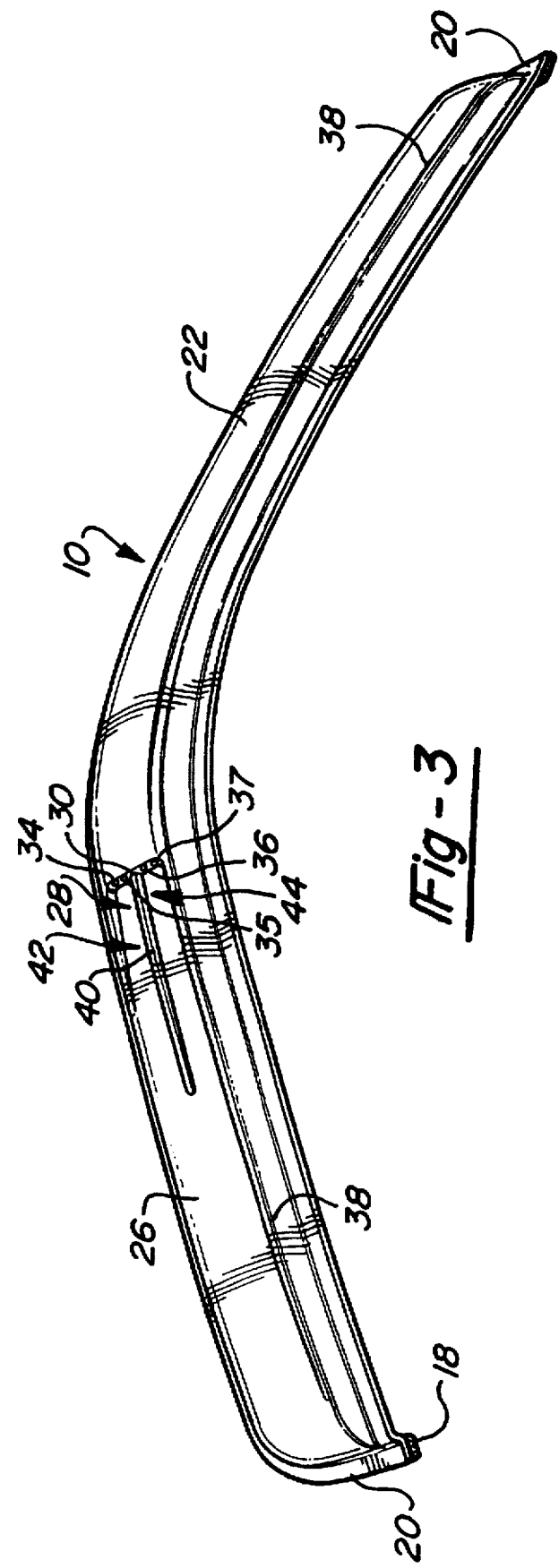
FIG. 3 is an enlarged perspective of the visor ventilator of FIG. 1.

Referring to FIGS. 1 and 3, a vehicle window visor or ventilator generally designated 10 is attached to the outer surface of a vehicle 12 which may be an automobile, truck, van, sport utility or other such vehicle having a side window 14 which may be lowered or otherwise opened within a window opening 16 in a side door 17 of the vehicle 12 via well known and conventional means. While various forms of attachment are possible the preferred form is via acrylic foam double sided adhesive tape 18 secured to the back of the mounting flange 20 which extends along the forward, top and rear periphery of the visor 10. Another form of attachment could be by insertion of the mounting flange 20 in the upper and forward window seal areas or by well known and conventional clips (not shown) inserted in the upper and/or forward window seals areas for attachment to the mounting flanges 20.

The visor 10 is preferably formed from a non-transparent molded sheet comprising ABS polymer which is well known and commercially available and can be painted. An advantage of the use of such material is the security afforded by the non-transparent visor obscuring a slightly open window. Alternatively, the visor or ventilator 10 can be formed from transparent clear or tinted acrylic or polycarbonate resins which are well known and commercially available and which have the advantage of improved visibility for the driver of the vehicle due to their transparency.

Referring to FIGS. 1–13 the visor 10 includes a forward portion 22 which is sized and configured to correspond with the outer surface of the vehicle 12 at the portion 24 of the door forward the window opening 16. Formed at an angle to but integral with the forward portion 24 is an upper portion 26 of the visor 10. Both the forward portion 22 and the upper portion 26 curves and projects generally outward from the mounting flange 20. The outwardly extending forward and upper portions 22,26 respectively extend rearward and downward to shield rain, snow and road noise from the forward and upper portions of the window opening 16 and preventing the same from entering the passenger compartment generally 13 when the window 14 is lowered to a partially open position providing a gap 27 between the top and front of the opening 16 and the window 14. A depression or recess 28 (FIGS. 9 and 11) is molded in the upper portion 26 of the visor 10. The depression 28 gradually tapers outwardly from a generally vertically oriented wall 30 which formes an inner pocket 32 generally opposite the depression 28. Four relatively small diameter spaced apart round holes 34, 35, 36 and 37 extend through the vertical wall 30 to allow airflow from the inner pocket 32 to the exterior of the ventilator 10. As the vehicle travels forward, air flowing over the outer surface of the ventilator 10 results in a drop in air pressure in the depression 28 of the upper portion 26. The relatively lower pressure in the depression or recessed area 28 draws air from the inner pocket 32 via a venturi effect caused by the restriction of the spaced apart small round holes 34, 35, 36 and 37. This venturi effect significantly enhances withdrawal of stale air from within the passenger compartment of the vehicle 12 through a partially open side window 16 out through the spaced apart round holes 34, 35, 36 and 37. As the vehicle speed is increased the venturi effect is enhanced resulting in enhanced removal of stale air from the passenger compartment. A centrally disposed rib 40 extends rearwardly from the vertical wall 30 in the recess 28 and divides the forward area of recess 28 into two parallel low pressure channels generally 42,44. An outwardly projecting lip 38 (FIGS. 7 through 13) is formed at the rearward edge of the ventilator forward portion 22 and extends along the lower edge of the upper portion 26 to enhance the structural integrity of the visor 10 and enhance moisture and noise deflection and air flow over the exterior surface of the visor 10.

Thus the visor side window ventilator 10 of the present invention significantly increases the ventilation of stale air from the passenger compartment of a moving vehicle via a venturi effect while deflecting undesired rain and snow and noise while a side window 14 is partially opened in a visor that is simple in operations, inexpensive to manufacture and attractive in styling.

Variations of the invention are possible without departing from the spirit and scope of the following claims.

We claim:

1. A visor for a side window of a vehicle having a side door and a passenger compartment, the side window movable within a window opening of the side door to a lower partially open position providing a gap between the top of the window and the top of the window opening, the visor comprising:

means for attaching the visor to the side door of the vehicle with the visor disposed in part above and extending generally horizontally along the top of the window opening;

a portion of the visor curving outwardly from the side door and extending downwardly below the level of the top of the window when the window is lowered to said lower partially open position to shield moisture and noise from entering the passenger compartment of the vehicle through said gap;

a wall forming an inward depression in the visor to lower the air pressure in said depression as the vehicle travels forward; said wall also forming an inner pocket on the inside of the visor; and a plurality of small round holes extending through said wall to cause a venturi effect which withdraws stale air from the passenger compartment through said inner pocket and in turn through said plurality of small round holes.

2. A visor for a side window of a vehicle having a side door and a passenger compartment, the side window movable within a window opening of the side door to a lower partially open position providing a gap between the top of the window and the top of the window opening, the visor comprising:

means for attaching the visor to the side door of the vehicle with the visor disposed in part above and extending generally horizontally along the top of the window opening;

a portion of the visor curving outwardly from the side door and extending downwardly below the level of the top of the window when the window is lowered to said lower partially open position to shield moisture and noise from entering the passenger compartment of the vehicle through said gap;

a wall forming an inward depression in the visor to lower the air pressure in said depression as the vehicle travels forward; said wall also forming an inner pocket on the inside of the visor;

a rib formed in said visor extending from said wall generally horizontally along a portion of said depression; and a plurality of small round holes extending through said wall to cause a venturi effect which withdraws stale air from the passenger compartment through said inner pocket and in turn through said plurality of small round holes.

3. A visor for a side window of a vehicle having a side door and a passenger compartment, the side window movable within a window opening of the side door to a lower partially open position providing a gap between the top of the window and the top of the window opening, the visor comprising:

means for attaching the visor to the side door of the vehicle with the visor disposed in part above and extending generally horizontally along the top of the window opening;

a portion of the visor curving outwardly from the side door and extending downwardly below the level of the top of the window when the window is lowered to said lower partially open position to shield moisture and noise from entering the passenger compartment of the vehicle through said gap;

a wall forming an inward depression in the visor to lower the air pressure in said depression as the vehicle travels forward; said wall also forming an inner pocket on the inside of the visor;

a rib formed in said visor extending from said wall generally horizontally along a portion of said depression;

an outwardly projecting lip formed at the outward edge of the visor; and a plurality of small round holes extending through said wall to cause a venturi effect which withdraws stale air from the passenger compartment through said inner pocket and in turn through said plurality of small round holes.

* * * * *